(12) United States Patent
Lawler et al.

(10) Patent No.: US 10,001,090 B1
(45) Date of Patent: Jun. 19, 2018

(54) SINGLE-FUEL REACTIVITY CONTROLLED COMPRESSION IGNITION COMBUSTION ENABLED BY ONBOARD FUEL REFORMATION

(71) Applicant: The Research Foundation for The State University of New York, Albany, NY (US)

(72) Inventors: Benjamin Lawler, Stony Brook, NY (US); Sotirios Mamalis, Stony Brook, NY (US)

(73) Assignee: The Research Foundation for The State University of New York, Albany, NY (US)

( * ) Notice: Subject to any disclaimer, the term of this patent is extended or adjusted under 35 U.S.C. 154(b) by 0 days. days.

(21) Appl. No.: 15/082,469

(22) Filed: Mar. 28, 2016

Related U.S. Application Data

(60) Provisional application No. 62/138,632, filed on Mar. 26, 2015.

(51) Int. Cl.
| | |
|---|---|
| *F02M 27/02* | (2006.01) |
| *F02M 43/00* | (2006.01) |
| *F02M 25/00* | (2006.01) |
| *F02B 23/06* | (2006.01) |

(52) U.S. Cl.
CPC ......... *F02M 27/02* (2013.01); *F02B 23/0663* (2013.01); *F02M 25/00* (2013.01); *F02M 43/00* (2013.01)

(58) Field of Classification Search
CPC ........ F02M 27/02; F02M 25/00; F02M 43/00; F02B 23/0663

USPC .......................................... 123/299, 304, 1 A
See application file for complete search history.

(56) References Cited

U.S. PATENT DOCUMENTS

| | | | | |
|---|---|---|---|---|
| 2008/0257304 | A1* | 10/2008 | Noda ................... | F02B 17/005 123/305 |
| 2009/0229541 | A1* | 9/2009 | Shimasaki ............... | F02B 1/12 123/3 |
| 2010/0174470 | A1* | 7/2010 | Bromberg ............... | F02B 17/00 701/103 |
| 2012/0247421 | A1* | 10/2012 | Reitz ....................... | F02B 1/14 123/299 |

OTHER PUBLICATIONS

Reitz, Rolf D. et al., Review of high efficiency and clean reactivity controlled compression ignition (RCCI) combustion in internal combustion engines, Progress in Energy and Combustion Science 46 (2015) 12-71, Copyright 2014 The Authors. Published by Elsevier Ltd.

(Continued)

*Primary Examiner* — Mahmoud Gimie
(74) *Attorney, Agent, or Firm* — The Farrell Law Firm, P.C.; John F. Gallagher, III

(57) ABSTRACT

Provided is an apparatus and method for operation of the apparatus that includes an onboard fuel reformer comprising a catalytic material, a shell containing the catalytic material enclosing an air/fuel mixture in a leak-free environment, an inlet to the shell for feeding the air and fuel, and an outlet to the shell for discharge of the reformate mixture at the completion of an air-fuel reaction, wherein a reactivity separation is provided for RCCI combustion between the reformate and the parent fuel, thereby enabling single-fuel RCCI.

3 Claims, 2 Drawing Sheets

(56) References Cited

OTHER PUBLICATIONS

Kokjohn, S. L. et al., Fuel reactivity controlled compression ignition (RCCI): a pathway to controlled high-efficiency clean combustion Int. J.Engine Res. vol. 12, 209-226, 2010.

Curran, Scott et al., Reactivity Controlled Compression Ignition Drive Cycle Emissions and Fuel Economy Estimations Using Vehicle Systems Simulations with E30 and ULSD, SAE Int. J. Engines vol. 7 Issue 2, Jul. 2014, 902-912.

Curran, Scott et al., Efficiency and Emissions Mapping of RCCI in a Light-Duty Diesel Engine, SAE International, Published Apr. 8, 2013, pp. 10.

Dec, John E., Advanced compression-ignition engines-understanding the in-cylinder processes, Proceedings of the Combustion Institute 32 (2009) 2727-2742, Copyright 2009 The Combustion Institute. Published by Elsevier Inc.

Kaddatz, John et al., Light-Duty Reactivity Controlled Compression Ignition Combustion Using a Cetane Improver, Copyright 2012 SAE International, pp. 16.

Splitter, Derek et al., High Efficiency, Low Emissions RCCI Combustion by Use of a Fuel Additive, SAE Int. J. Fuels Lubr., vol. 3, Issue 2, Copyright 2010 SAE International, 742-756.

Dempsey, Adam B. et al., Effect of Cetane Improvers on Gasoline, Ethanol, and Methanol Reactivity and the Implications for RCCI Combustion, Copyright 2013 SAE International, pp. 170-187.

Dempsey, Adam B. et al., Characterization of Reactivity Controlled Compression IgnitionDirect-Injected Gasoline with a Cetane Improver on a Direct-Injected Gasoline with a Cetane Improver on a Multi-Cylinder Engine, Copyright 2015 SAE International, pp. 859-877.

Nieman, Derek E. et al., Heavy-Duty RCCI Operation Using Natural Gas and Diesel, Copyright 2012 SAE International, pp. 270-285.

Dempsey, Adam B. et al., Reactivity Controlled Compression Ignition Using Premixed Hydrated Ethanol and Direct Injection Diesel, Journal of Engineering for Gas Turbines and Power, Aug. 2012, vol. 134, Copyright 2012 by ASME, pp. 11.

Splitter, Derek et al., RCCI Engine Operation Toward 60% Thermal Efficiency, Copyright 2013 SAE International, pp. 20.

Kohn, McKenzie P. et al., Auto-thermal and dry reforming of landfill gas over a Rh/yA12O3 monolith catalyst, Applied Catalysis B: Environmental 94 (2010) pp. 125-133, Copyright 2009 Elsevier B.V.

Barrai, Federico et al., The role of carbon deposition on precious metal catalyst activity during dry reforming of biogas, Catalysis Today 129 (2007), pp. 391-396, Copyright 2007 Elsevier B.V.

Castaldi, Marco J. et al., Effect of water on performance and sizing of fuel-processing reactors, Catalysis Today 99 (2005) pp. 339-346, Copyright 2004 Elsevier B.V.

Wermuth, Nicole et al., Enhancing Light Load HCCI Combustion in a Direct Injection Gasoline Engine by Fuel Reforming During Recompression, Copyright 2009 SAE International, pp. 14.

Steeper, Richard R. et al., Analysis of Gasoline Negative-Valve-Overlap Fueling via Dump Sampling, Copyright 2014 SAE International, pp. 762-771.

Peterson, Brian et al., Investigation of Negative Valve Overlap Reforming Products Using Gas Sampling and Single-Zone Modeling, Copyright 2015 SAE International, pp. 747-757.

Szybist, James P. et al., Negative Valve Overlap Reforming Chemistry in Low-Oxygen Environments, SAE Int. J. Engines, vol. 7, Issue I (May 2014), pp. 418-433.

Vaughan, Adam et al., A Cycle-to-Cycle Method to Predict HCCI Combustion Phasing, Proceedings of the ASME 2013 Internal Combustion Engine Division Fall Technical Conference, ICEF 2013, Oct. 13-16, 2013, Copyright 2013 by ASMA, pp. 12.

\* cited by examiner

SINGLE-FUEL REACTIVITY CONTROLLED COMPRESSION IGNITION COMBUSTION ENABLED BY ONBOARD FUEL REFORMATION

PRIORITY

This application claims priority to U.S. Provisional Patent Application No. 62/138,632 filed on Mar. 26, 2015, the entire content of which is incorporated herein by reference.

BACKGROUND OF THE INVENTION

1. Field of the Invention

The present invention relates generally to reactivity controlled compression ignition combustion systems.

2. Description of the Related Art

Reactivity controlled compression ignition (RCCI) combustion has demonstrated efficiency and emissions improvements compared to both diesel and spark ignited (SI) combustion modes [1-4]. Specifically, RCCI combustion has demonstrated a 20% fuel economy increase compared to SI combustion modes [3], and a 5% efficiency improvement at certain engine speeds and loads over diesel combustion modes, while maintaining significantly lower engine-out soot and NOx emissions [4].

General Motors, Sandia and Oak Ridge National Laboratories, and the University of Michigan have investigated the effects of injecting fuel during the negative valve overlap (NVO) period of Homogeneous Charge Compression Ignition (HCCI) [17-21]. Experimental results from Oak Ridge and the University of Michigan show that combustion phasing in HCCI can be controlled by the amount of fuel injected into the NVO period and the NVO injection timing [20-21]. Experimental results from General Motors show that leaner mixtures can be ignited when a portion of the fuel is injected during the NVO period compared to the same conditions without NVO fuel injection [17].

Rapid gas sampling experiments by Dick Steeper, and later by Brian Peterson and Isaac Ekoto at Sandia determined that the elevated pressure and temperature and oxygen deficiency of NVO partially reforms the fuel, producing $H_2$, CO, and partially oxidized hydrocarbon species [18-19]. NVO fuel injection has a very similar effect to pre-processing the fuel in a fuel reformer. As a result, NVO fuel injection research experimentally demonstrates differences between reformate and parent fuel on low temperature combustion (LTC) in terms of auto-ignition chemistry. Data in the literature shows that reformate of gasoline is more reactive than the unaltered gasoline [17-21], and the data indicates that partially reforming the fuel changes the properties and the auto-ignition chemistry.

LTC is a subset of advanced combustion strategies with the potential to increase efficiency and reduce engine-out emissions [5-6]. RCCI is one of the most promising LTC modes because RCCI uses two fuels to create a gradient of fuel reactivity in the cylinder, which provides control over the combustion process [1-4]. In RCCI, the lower reactivity fuel, conventionally gasoline, is injected in the intake port to form a homogeneous mixture with the air. During the mid to late compression stroke, the higher reactivity fuel, conventionally diesel, is injected directly into the cylinder. The high reactivity fuel injection timing is earlier than that of conventional diesel combustion, which gives the high reactivity fuel sufficient time to evaporate, but not sufficient time to completely mix and form a homogeneous mixture with the air and low reactivity fuel. The result is near-zero amounts of particulate matter emissions with a distribution of fuel reactivity to control the rate of combustion and pressure rise. In this way, RCCI is able to achieve the low emissions and high efficiencies associated with LTC while providing control over combustion. Nevertheless, the requirement of two completely independent fuel systems has significantly limited the commercialization of RCCI.

In an attempt to address the requirement of two independent fuel systems, researchers have conducted RCCI experiments using a single, gasoline-like, fuel with the assistance of cetane improvers; di-tertiary butyl peroxide (DTBP) and 2-ethylhexyl nitrate (2-EHN) [7-10]. Unaltered gasoline is used as the premixed, low-reactivity fuel, and gasoline mixed with the cetane improver is used as the DI, high-reactivity fuel. However, there are several drawbacks to this conventional approach. First, DTBP is a less effective cetane improver than 2-EHN, which increases the consumed additive quantity. Second, 2-EHN has a fuel-bound nitrogen oxide group and, as a result, the NOx emissions increase linearly with the amount of 2-EHN consumed [9-10]. Also, 2-EHN is thermally unstable above approximately 100° C., which is why it is an effective cetane improver, but presents challenges in vehicle applications. Lastly, conventional systems require a secondary liquid that must be refilled periodically.

RCCI combustion has shown potential for increased efficiency and decreased emissions, but is limited by the requirement of two distinct fuels. Research on gasoline RCCI with additives has had some success, but identified drawbacks associated with the additives. Accordingly, a need exists for a compact onboard fuel reformer to create the reactivity separation necessary for RCCI combustion between the reformate and the parent fuel, enabling single-fuel RCCI and the commercialization of RCCI.

SUMMARY OF THE INVENTION

The present invention has been made to address at least the above problems and/or disadvantages and to provide at least the advantages described below. Accordingly, an aspect of the present invention provides a method of interactive visualization. To resolve the drawbacks and disadvantages of conventional systems, the present disclosure uses a single fuel with an onboard fuel reformer to create the necessary separation in fuel reactivity.

According to one aspect of the present invention, an apparatus is provided that includes an onboard fuel reformer comprising a catalytic material, a shell containing the catalytic material enclosing an air/fuel mixture in a leak-free environment, an inlet to the shell for feeding the air and fuel, and an outlet to the shell for discharge of the reformate mixture at the completion of an air-fuel reaction, wherein a reactivity separation is provided for RCCI combustion between the reformate and the parent fuel, thereby enabling single-fuel RCCI.

BRIEF DESCRIPTION OF THE DRAWINGS

The above and other aspects, features and advantages of the present invention will be more apparent from the following detailed description when taken in conjunction with the accompanying drawings, in which.

DETAILED DESCRIPTION OF EMBODIMENTS OF THE PRESENT INVENTION

Embodiments of the present disclosure are described in detail with reference to the accompanying drawings. Detailed descriptions of constructions or processes known in the art may be omitted to avoid obscuring the subject matter of the present disclosure. Further, in the following description of the present disclosure, various specific definitions found in the following description are provided only to provide a general understanding of the present disclosure, and it is apparent to those skilled in the art that the present disclosure can be implemented without such definitions.

According to an embodiment of the present disclosure, an inline, onboard fuel reformer is provided to create separation in fuel properties necessary for RCCI combustion from a single fuel, to completely eliminate the requirement to periodically refill a secondary liquid, as in conventional systems. RCCI differs significantly from the traditional SI and diesel combustion. SI engines use a single fuel, e.g. gasoline, ethanol, natural gas, that is port fuel injected or direct injected, operate at stoichiometry, and ignite the mixture using a spark. The mixture is burned by flame propagation in the cylinder and a burn rate for a given fuel is primarily controlled by turbulence in the combustion chamber. Diesel engines also use a single fuel, e.g. diesel, biodiesel, which is injected directly into the cylinder at high pressure to mix with the intake air. The mixture is ignited by compression alone and is consumed in a diffusion-type flame. The burn rate is primarily controlled by mixing between fuel and air.

In contrast, RCCI combustion is achieved by auto-ignition of the fuel-air mixture through compression by the piston. However, unlike diesel, one of the two fuels is premixed in the intake. The other fuel is direct injected, similarly to conventional diesel combustion. However, the injection timings differ by a significant amount and the physical process of combustion is therefore inherently different. The goal of the direct injection of the high reactivity fuel in RCCI is to use the two fuels and the specific injection timing of the high reactivity fuel to create a stratification of reactivity in the combustion chamber. Based on this stratification, RCCI can operate in a low-temperature combustion mode, which helps avoid soot and NOx formation. In contrast to SI and diesel engines, the mixture is burned by bulk auto-ignition and the burn rate is controlled by chemical kinetics and the stratification of fuel properties in the cylinder at top dead center (TDC). The use of reforming technology produces one of the fuel streams having sufficient octane number difference from the parent fuel in order to realize the reactivity-controlled combustion process.

Figure 1:
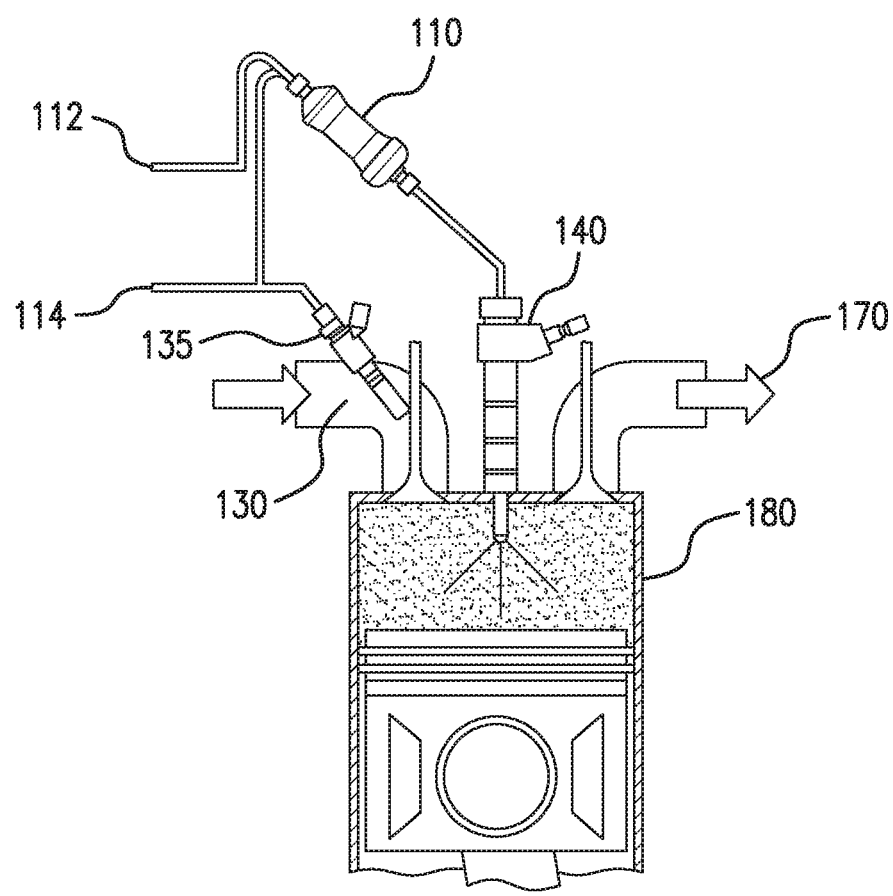
FIG. 1 illustrates an apparatus for blending single-fuel, reformate RCCI enabled by onboard fuel reformation, for one of a gasoline and natural gas configurations, according to an embodiment of the present disclosure.

FIG. 1 illustrates an apparatus for blending single-fuel, reformate RCCI that is enabled by onboard fuel reformation. The blending apparatus of FIG. 1 is configured for one of a gasoline and natural gas as the primary fuel, with fuel storage in a tank of a vehicle being sent to the engine unaltered, via injector 135 positioned in air inlet 130.

A portion of the same fuel from the tank is separately input into onboard fuel reformer 110 via reformer fuel inlet 114. The reformer 110 reforms the fuel into a mixture of $H_2$, CO, and partially oxidized hydrocarbon species, i.e., reformate. The onboard fuel reformer 110 includes a catalytic material, e.g., a precious metal, contained in a housing having a shell that contains the catalytic material and encloses an air/fuel mixture in a leak-free environment.

The reformer 110 creates a separate fuel stream, i.e. reformate, having thermodynamic and chemical properties that are distinct from the parent fuel. The reformer 110 partially oxidizes the fuel in a rich environment using catalysts and either air or steam, outputting a resultant mixture composed of $H_2$ and CO, with partially reformed hydrocarbon species, depending on the degree of reformation. The reformer 110 creates a fuel-rich environment enabling only partially oxidized products, as opposed to fully oxidizing the fuel to $CO_2$ and $H_2O$, i.e., a catalytic partial oxidation (CPDX) process. The reformer 110 is an inline reformer capable of performing the CPDX process or reaction on a single hydrocarbon fuel, with the CPDX process of reformer 110 being self-sustaining upon achieving light-off temperature.

Accordingly, fuel from the tank is directed to the engine cylinder unaltered, and a second branch of the same fuel stream is processed by the onboard reformer 110 to produce a reformate, i.e., a fuel mixture of H2, CO, and partially reacted hydrocarbon species with properties different from the initial parent fuel.

As shown in FIG. 1, the less reactive fuel is port fuel injected and the higher reactivity reformate is direct injected. That is, when the fuel is one of gasoline and natural gas, the output by the fuel reformer 110 is injected into at least one engine cylinder 180 via injector 140, as shown in FIG. 1.

Figure 2:
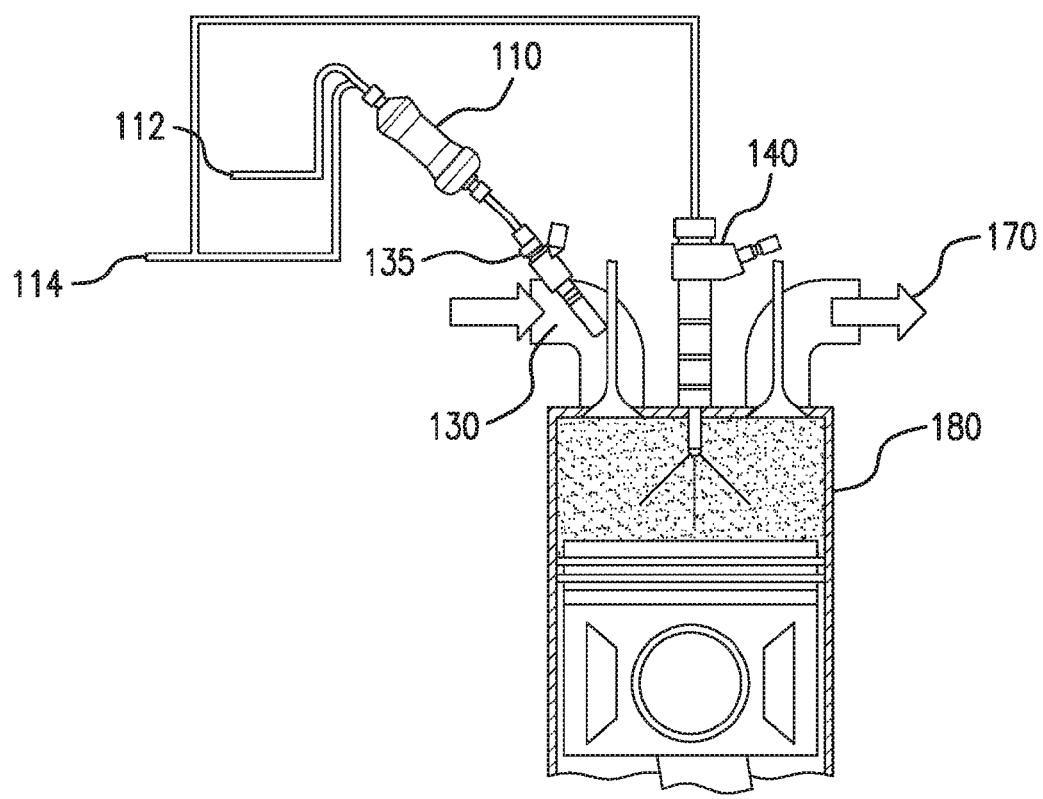
FIG. 2 illustrates an apparatus for blending single-fuel, reformate RCCI, for a diesel parent fuel configuration, according to an embodiment of the present disclosure.

FIG. 2 illustrates a blending mechanism for single-fuel, reformate RCCI, for a diesel parent fuel configuration, according to an embodiment of the present disclosure.

As shown in FIG. 2, for the diesel parent fuel configuration, the output by the fuel reformer 110 is injected into at least one engine cylinder 180 via injector 135 and the parent fuel is injected via injector 140.

As shown in FIGS. 1 and 2, the reformer 110 utilizes air input via reformer air inlet 112, cylinder 180 intakes air via air inlet 130, and cylinder 180 outputs exhaust via exhaust 170.

Accordingly, provided is a single-fuel system that, instead of using additives to alter the fuel properties and create the second fuel stream, uses a fuel reformer to create two fuel streams. The two fuel streams are a parent fuel and a reformate thereof, and the reformer provides an onboard octane number separation, which allows two fuel streams of sufficiently different octane numbers to be used for RCCI combustion, thereby providing an apparatus usable with diesel, gasoline, or natural gas as the parent fuel. When diesel is used as the parent fuel, the reformate mixture leaving the fuel reformer is less reactive than the parent diesel fuel and therefore the reformate is port fuel injected or fumigated in the intake port, while the parent diesel fuel would be direct injected into the cylinder, as shown in FIG. 2. When gasoline or natural gas is used as the parent fuel, the reformate mixture is more reactive than the parent fuel, and the gasoline or natural gas is port fuel injected into the intake port and the reformate mixture is direct injected into the combustion chamber, as shown in FIG. 1.

The injection timings of the high reactivity fuel is similar to conventional RCCI if the fuel is liquid, as would be the case when using diesel as the parent fuel. Specifically, the diesel would be injected approximately 50 degrees before TDC. However, if gasoline or natural gas is used as the parent fuel; then the reformate mixture is direct-injected in gaseous phase and the injection timings would be significantly different from conventional RCCI, possibly being significantly earlier.

If a liquid fuel is used, i.e. gasoline or diesel, then the fuel is initially vaporized in a fuel vaporizer to create a gaseous mixture with air. The fuel-air mixture is then directed through the fuel reformer where the reformer partially oxidizes the fuel in a rich environment, producing a mixture of carbon monoxide, hydrogen, and other partially oxidized hydrocarbon species. This mixture, i.e., the reformate, has distinctly different auto-ignition properties compared with the original parent fuel.

While the invention has been shown and described with reference to certain embodiments thereof, it will be understood by those skilled in the art that various changes in form and detail may be made therein without departing from the spirit and scope of the invention as defined by the appended claims and equivalents thereof.

REFERENCES

[1] Reitz, R., and Duraisamy, G., "Review of high efficiency and clean reactivity controlled compression ignition (RCCI) combustion in internal combustion engines," Progress in Energy and Combustion Science, Volume 46, February 2015, Pages 12-71, ISSN 0360-1285.

[2] Kokjohn, S., Hanson, R., Splitter, D., and Reitz, R., "Fuel Reactivity Controlled Compression Ignition (RCCI): A Pathway to Controlled High-Efficiency Clean Combustion," International Journal of Engine Research, Special Issue, Vol. 12, pp. 209-226, 2011.

[3] Curran, S., Gao, Z., and Wagner, R., "Reactivity Controlled Compression Ignition Drive Cycle Emissions and Fuel Economy Estimations Using Vehicle Systems Simulations with E30 and ULSD," SAE Int. J. Engines, 2014.

[4] Curran, S., Hanson, R., Wagner, R., and Reitz, R., "Efficiency and Emissions Mapping of RCCI in a Light-Duty Diesel Engine," SAE Technical Paper 2013-01-0289, 2013.

[5] Dec, J., "Advanced compression-ignition engines-understanding the in-cylinder processes," Proceedings of the Combustion Institute, 32 (2) (2009), pp. 2727-2742.

[6] Zhao, F., Asmus, T., Assanis, D., Dec, J., Eng, J., and Najt, P., "Homogeneous charge compression ignition (HCCI) engines, key research and development issues," SAE Publication PT-94, Society of Automotive Engineers (2003).

[7] Splitter, D., Reitz, R., and Hanson, R., "High Efficiency, Low Emissions RCCI Combustion by Use of a Fuel Additive," SAE Int. J. Fuels Lubr. 3(2):742-756, 2010.

[8] Kaddatz, J., Andrie, M., Reitz, R., and Kokjohn, S., "Light-Duty Reactivity Controlled Compression Ignition Combustion Using a Cetane Improver," SAE Technical Paper 2012-01-1110, 2012.

[9] Dempsey, A., Walker, N., and Reitz, R., "Effect of Cetane Improvers on Gasoline, Ethanol, and Methanol Reactivity and the Implications for RCCI Combustion," SAE Int. J. Fuels Lubr. 6(1):170-187, 2013.

[10] Dempsey, A., Curran, S., and Reitz, R., "Characterization of Reactivity Controlled Compression Ignition (RCCI) Using Premixed Gasoline and Direct-Injected Gasoline with a Cetane Improver on a Multi-Cylinder Engine," SAE Technical Paper 2015-01-0855, 2015.

[11] Nieman, D., Dempsey, A., and Reitz, R., "Heavy-Duty RCCI Operation Using Natural Gas and Diesel," SAE Int. J. Engines 5(2):270-285, 2012.

[12] Dempsey Adam B., Das Adhikary Bishwadipa, Viswanathan Sandeep, et al. Reactivity Controlled Compression Ignition Using Premixed Hydrated Ethanol and Direct Injection Diesel J. Eng. Gas Turbines Power 134(8), 2012.

[13] Splitter, D. A., Wissink, M., DelVescovo, D., and Reitz, R. D., "RCCI Engine Operation Towards 60% Thermal Efficiency," SAE Paper 2013-01-0279, 2013.

[14] Kohn, M., Castaldi M. J., and Farrauto, R. J., "Auto-thermal and Dry Reforming of landfill gas over a Rh/$\gamma$Al2O3 monolith catalyst." App. Catal. B: Environ, (94), 2010, 125-133.

[15] Barrai, F.; Jackson, T.; Whitmore, N.; Castaldi, M. J, "The role of carbon deposition on precious metal catalyst activity during dry reforming of biogas." Catalysis Today 2007, 129, (3-4), 391-396.

[16] Castaldi, M. J; LaPierre, R.; Lyubovski, M.; Pfefferle, W.; Roychoudhury, S., "Effect of water on performance and sizing of fuel-processing reactors." Catalysis Today 2005, 99,( 3-4), 339-346.

[17] Wermuth, N., Yun, H., and Najt, P., "Enhancing Light Load HCCI Combustion in a Direct Injection Gasoline Engine by Fuel Reforming During Recompression," SAE Int. J. Engines 2(1):823-836, 2009.

[18] Steeper, R. and Davisson, M., "Analysis of Gasoline Negative-Valve-Overlap Fueling via Dump Sampling," SAE Int. J. Engines 7(2):762-771, 2014.

[19] Peterson, B., Ekoto, I., and Northrop, W., "Investigation of Negative Valve Overlap Reforming Products Using Gas Sampling and Single-Zone Modeling," SAE Technical Paper 2015-01-0818, 2015.

[20] Szybist, J., Steeper, R., Splitter, D., Kalaskar, V. et al., "Negative Valve Overlap Reforming Chemistry in Low-Oxygen Environments," SAE Int. J. Engines 7(1):418-433, 2014.

[21] Vaughan, A., and Bohac, S., "A Cycle-to-Cycle Method to Predict HCCI Combustion Phasing," Proceedings of the ASME 2013 Internal Combustion Engine Division Fall Technical Conference, 2013.

What is claimed is:

1. An apparatus comprising:
   a cylinder comprising at least one air inlet and at least one exhaust;
   a first injector;
   a second injector; and
   a reformer including at least one reformer air inlet and at least one reformer fuel inlet,
   wherein the second injector injects unprocessed parent fuel for combustion in the cylinder,
   wherein the unprocessed parent fuel is input into the least one reformer fuel inlet,
   wherein the reformer performs a catalytic partial oxidation process and outputs a reformed fuel, which is separately injected into the cylinder for combustion with the unprocessed parent fuel,
   wherein a reactivity separation is provided for Reactivity Controlled Compression Ignition (RCCI) combustion between the reformed fuel and the parent fuel, thereby enabling single-fuel RCCI, and
   wherein the reactivity separation provides an octane number separation that produces two fuel streams of different octane numbers for the RCCI combustion.

2. The apparatus of claim 1, wherein the onboard fuel reformer further comprises a shell containing a catalytic material, and
   wherein the shell is configured to contain a mixture of the unprocessed parent fuel and input air, to contain an air-fuel reaction between the unprocessed parent fuel, the input air and the catalytic material.

3. The apparatus of claim 1, wherein the reactivity separation enables the single-fuel RCCI.

\* \* \* \* \*